(12) United States Patent
Nishino et al.

(10) Patent No.: US 7,492,378 B2
(45) Date of Patent: Feb. 17, 2009

(54) IMAGE DISPLAY SYSTEM IMPLEMENTS A LIGHT SOURCE WITH A CONTROLLABLE SCHEDULE TO EMIT LIGHT OF ADJUSTABLE INTENSITIES

(75) Inventors: Hirokazu Nishino, Akishima (JP); Yoshihiro Maeda, Hachioji (JP); Kazuma Arai, Kitanodai hachiouji (JP); Fusao Ishii, Menlo Park, CA (US)

(73) Assignees: Silicon Quest Kabushiki-Kaisha, Kamakura-shi, Tokyo (JP); Olympus Corporation, Tokyo (JP)

( * ) Notice: Subject to any disclaimer, the term of this patent is extended or adjusted under 35 U.S.C. 154(b) by 0 days.

(21) Appl. No.: 11/893,696

(22) Filed: Aug. 16, 2007

(65) Prior Publication Data

US 2007/0285345 A1 Dec. 13, 2007

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/839,637, filed on Aug. 23, 2006.

(51) Int. Cl.
*G09G 5/00* (2006.01)
*G09G 5/02* (2006.01)

(52) U.S. Cl. .............................. 345/694; 345/697; 345/6

(58) Field of Classification Search .................. 345/82, 345/84, 89, 55–100, 204–214, 690–697, 345/6; 349/5–10, 25
See application file for complete search history.

(56) References Cited

U.S. PATENT DOCUMENTS 5,706,061 A * 1/1998 Marshall et al. ............. 348/743
2005/0200939 A1 * 9/2005 Huibers ...................... 359/290

* cited by examiner

*Primary Examiner*—David L Lewis
(74) *Attorney, Agent, or Firm*—Bo-In Lin

(57) ABSTRACT

An image display system includes a light source for projecting an illumination light. The image display system further includes a light source control unit that controls the light source to adjust the illumination intensity and/or light emission time of the illumination light. The display system further includes an SLM (Spatial Light Modulator) having a plurality of pixel elements. The SLM modulates the incident illumination light to generate gray scales. The light source control unit controls the light source during at least one time slice in one frame period, and the SLM uses that time slice to control a minimum adjustable gray scale.

8 Claims, 18 Drawing Sheets

Fig. 1A (Prior Art)
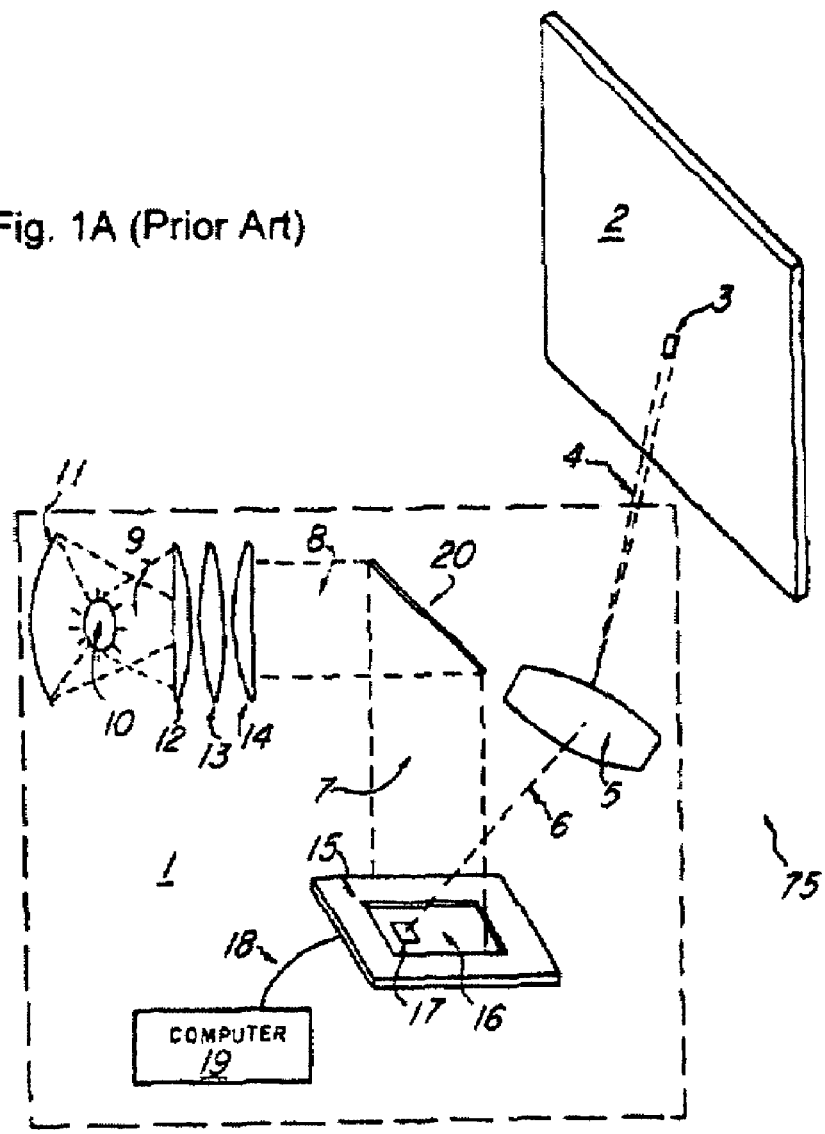
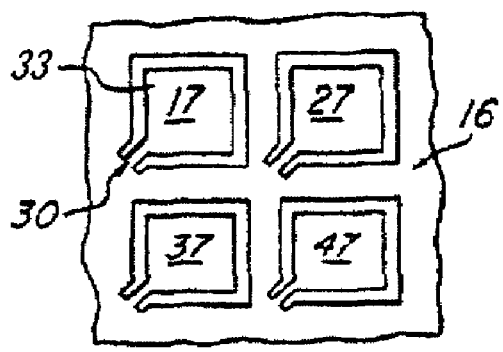
Fig. 1B (Prior Art)

IMAGE DISPLAY SYSTEM IMPLEMENTS A LIGHT SOURCE WITH A CONTROLLABLE SCHEDULE TO EMIT LIGHT OF ADJUSTABLE INTENSITIES

CROSS REFERENCE TO RELATED APPLICATIONS

This application is a Non-provisional Application of a Provisional Application 60/839,637 filed on Aug. 23, 2006. The Provisional Application 60/839,637 is a Continuation in Part (CIP) Application of a U.S. patent application Ser. No. 11/121,543 filed on May 4, 2005 now U.S. Pat. No. 7,268,932. The application Ser. No. 11/121,543 is a Continuation in part (CIP) Application of three previously filed Applications. These three Applications are Ser. No. 10/698,620 filed on Nov. 1, 2003, Ser. No. 10/699,140 filed on Nov. 1, 2003, now U.S. Pat. No. 6,862,127 and Ser. No. 10/699,143 filed on Nov. 1, 2003 now U.S. Pat. No. 6,903,860, by one of the Applicants of this Patent Application. The disclosures made in these Patent Applications are hereby incorporated by reference in this Patent Application.

BACKGROUND OF THE INVENTION

1. Field of the Invention

The present invention relates to an image display system that modulates illumination light from a light source and projects and displays desired images. More particularly, this invention relates to an image display system implemented with a light source controlled to project light of variable intensities to further increase the number of gray scales for improving the quality of image display.

2. Description of the Related Arts

After the dominance of CRT technology in the display industry over the past 100 years, the Flat Panel Display (hereafter FPD) and Projection Display technologies are now gaining popularity because of a smaller form-factor of the display control system while enabled to project and display image of greater size onto a bigger display screen. Among several types of projection display systems, projection display systems using micro-display are gaining consumers' recognition because of high performance of picture quality as well as lower cost than the display systems implemented with FPDs. There are two types of micro-display technologies implemented in the projection display systems now made available in the market. The first type of display system is the micro-LCD (Liquid Crystal Display) system and the other type display system is the display system that implements the micromirror technology. Because a micromirror device uses un-polarized light, a micromirror device has an advantage that the display image projected from the micromirror device has a higher brightness over the display image projected from a micro-LCD system, which uses polarized light.

Even though there are significant advances of the technologies in implementing an electromechanical mirror device as a spatial light modulator (SLM) in recent years, there are still limitations and difficulties when it is employed to provide a high quality image. Specifically, when the images are digitally controlled, the image quality is adversely affected due to the fact that the images are not displayed with sufficient number of gray scales.

An electromechanical mirror device is drawing a considerable interest as a spatial light modulator (SLM). The electromechanical mirror device includes "a mirror array" that has a large number of mirror elements. In general, the mirror elements from 60,000 to several millions are arranged on a surface of a substrate in an electromechanical mirror device. Referring to FIG. 1A for an image display system 1 including a screen 2 is disclosed in a reference U.S. Pat. No. 5,214,420. A light source 10 is used for generating light energy for illuminating the screen 2. The generated light 9 is further collimated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array includes switchable reflective elements 17, 27, 37, and 47 each comprising a mirror 33 connected by a hinge 30 and supported on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is redirected away from the display screen 2 and hence the pixel 3 is dark.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines the least amount of adjustable brightness for adjusting the gray scale, is the light reflected during the time duration according to the least pulse width. The limited gray scale due to the LSB limitation leads to a degradation of the quality of the display image.

Specifically, FIG. 1C shows an exemplary control circuit for controlling a mirror element according to the disclosures made in U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based of a Static Random Access Switch Memory (SRAM) design. The transistor M9 connected to a Row-line receives a DATA signal via a Bit-line. The memory cell 32 written data is accessed when the transistor M9, which has received the ROW signal on a Word-line is turned on. The latch 32a includes two cross-coupled inverters, i.e., M5/M6 and M7/M8, which permit two stable states, that is, a state 1 is Node A high and Node B low, and a state 2 is Node A low and Node B high. The control circuit as illustrated in FIG. 1C controls the micromirrors to switch between two states and the control circuit drives the mirror to oscillate to either an ON or OFF deflected angle (or position) as shown in FIG. 1A.

The minimum quantity of light controllable to reflect from each mirror element for image display, i.e., the resolution of gray scale of image display for a digitally controlled image display apparatus, is determined by the least length of time that the mirror is controllable to hold at the ON position. The length of time that each mirror is controlled to hold at an ON position is in turn controlled by multiple bit words. FIG. 1D shows the "binary time periods" in the case of controlling SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

As illustrated in FIG. 2A, when adjacent image pixels are displayed with a brightness controlled by very coarse gray scales, the adjacent pixels may be displayed with great differences of quantity of light, thus, artifacts are shown between these adjacent image pixels. That leads to the degradations of display image qualities. The degradations of image qualities are specially pronounced in the bright areas of image when there are "bigger gaps" of gray scale, i.e. quantity of light, between adjacent image pixels. For example, the bright areas are generally observed on the forehead, the sides of the nose and the upper arm in an image of human and there are artifacts shown in these bright areas when displayed with gray scales of coarse resolutions. The artifacts are caused by a technical limitation that the digitally controlled image does not obtain sufficient number of the gray scale, i.e. the levels of the quantity of light. At the bright spots of display, e.g., the forehead, the sides of the nose and the upper arm, the adjacent pixels are displayed with visible gaps of light intensities. When the levels of gray scales are increased, the image degradation is significantly reduced even with only twice more levels of gray scales as illustrated in FIG. 2B.

Therefore, when the mirrors are controlled to operate at either ON or OFF position then the adjustable quantity of light of a displayed image is controlled by the length of time each mirror is held at the ON position. In order to increase the number of the levels of the controllable quantity of light, the switching speed of the ON and OFF positions for the mirror must be increased. A higher number of bits is therefore required to control the ON and OFF states of the micromirrors. However, when the switching speed of the mirror deflection is increased, a stronger hinge for supporting the mirror is necessary to sustain a required number of switches of the ON and OFF positions for the mirror deflection. Furthermore, in order to drive the mirrors provided strengthened hinge toward the ON or OFF positions, it becomes necessary to apply a higher voltage to the electrode. The higher voltage may exceed twenty volts and may even be as high as thirty volts. The mirrors produced by applying the CMOS technologies probably is not appropriate for operating the mirror at such a high range of voltages, and therefore the DMOS mirror devices may be required. In order to achieve a control of higher number of the gray scales, a more complicated production process and larger device areas are required to produce the DMOS mirror. Conventional mirror controls are therefore faced with a technical problem that higher level of gray scales and can only be achieved by operating the micromirrors at a range of higher voltage to maintain the benefits of manufacturing a smaller image display apparatus.

There are many patents related to the control of quantity of light. These Patents include U.S. Pat. Nos. 5,589,852, 5,617,243, 5,668,611, 5,706,061, 5,903,323, 6,232,963, 6,262,829, 6,592,227, 6,648,476, 6,819,064, and 6,975,366. There are further patents and patent applications related to different sorts of light sources. These Patents include U.S. Pat. Nos. 5,442,414, 6,036,318 and Application 20030147052. Also, the U.S. Pat. No. 6,746,123 has disclosed particular polarized light sources for preventing the loss of light. However, these patents or patent applications do not provide an effective solution to attain a sufficient number of the gray scale in the digitally controlled image display system.

Furthermore, there are many patents related to a spatial light modulation that includes the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties. Therefore, a need still exists in the art of image display systems applying digital control of a micromirror array as a spatial light modulator to provide new and improved systems such that the above-discussed difficulties can be resolved. The major difficulty that hinders the increase of the gray scales of image display is caused by the ON-OFF control scheme of the conventional systems that limits the minimum ON time to adjust the brightness of a display image. The minimum ON time determines the height of the steps of gray scale in FIG. 2. There is no way to provide the adjustable brightness that is lower than the step by controlling the micromirrors. In order to overcome the problems of the degradation of picture quality it is necessary to increase the level of adjustable brightness with adjustable brightness lower than the step shown in FIG. 2.

There is an increasing demand for an image display system to display image with higher image quality. One of the determining factors for displaying an image with improved image quality is to increase the pixel resolution such as in a high definition (HD) display system a HD-level (1920×1080) high resolution is gaining popularity. However, another important factor for improving the image quality is to increase the level of gray scales and as of now most of image display systems still use an 8-bit display mode (8 bits for each of RGB colors, for example). In order to improve the image display quality, it is foreseeable that in the near future, it is desirable and necessary that an image display system uses a greater number of gray scales, for example, gray scales controlled by digital word 10 bits or more.

A micromirror device is implemented as a display system for wide screen image display configured either as a front projector or a rear-projection TV. A micro-mirror device as now implemented in the display systems deflects the illumination light in two directions, ON and OFF. When PWM control is used to modulate illumination light (hereinafter simply referred to as PWM modulation), each of gray scales of images or videos are expressed by the sum of the amounts of reflected light during ON time (time during which illumination light is deflected in the ON direction) in one frame period. To express 8-bit gray scales (256 gray scales), the micro-mirror device uses PWM modulation in which a minimum unit (LSB) is $1/256$ of one frame period. To express 10-bit gray scales (1024 gray scales), the micro-mirror device uses PWM modulation in which the LSB is $1/4$ of that required to express 256 gray scales. In this case, the micro-mirror device performs ON/OFF control of each mirror element at the speed four times the speed required to express 256 gray scales. To operate a mirror element at a faster speed, it is necessary to tilt the mirror with a stronger spring. To tilt the mirror with a stronger spring, it is necessary to control the mirror element at a higher voltage. Furthermore, the number of repetitive operations of the mirror element increases. An increased number of mirror element motions reduce the lifetime of the spring that tilts the mirror. Therefore, a need still exists to further improve the image display systems such that the above discussed difficulties and limitations can be resolved.

SUMMARY OF THE INVENTION

In view of the above circumstances, an aspect of the invention is to provide an image display system using a spatial light modulator (SLM), such as a micro-mirror device, in which an image with a greater number of gray scales can be displayed without operating the SLM at an excessively fast speed or excessively increasing the number of repetitive operations of the SLM such that the above discussed problems and limitations can be resolved.

The image display system according to one aspect of the invention includes an illumination light projected from a light source controlled by a light source control unit to adjust the illumination intensity and/or light emission time of the illumination light. The illumination light is projected from the light source to an SLM (Spatial Light Modulator) that includes a plurality of pixel elements. With adjustable light intensity levels of the incident illumination light, the SLM modulates the incident light to generate images with increase level of gray scales. The light source control unit controls the light source during at least one time slice in one frame period, and the SLM modulates the incident light within that time slice to generate a reduced controllable minimum brightness such that the level of gray scale may be increased.

The image display system according to another aspect of the invention includes a light source controlled by a light source control unit to project an illumination light with adjustable intensity and/or light emission time an SLM having a plurality of pixel elements for modulating the incident light in each of a time frame of a display frame to generate display image with adjustable gray scales. The timing control unit controls the light source control unit and the SLM in such a way that there are flexibility that the start and end timings of the time slice are not required to coincide with transition states of all the pixel elements in the SLM. The SLM modulates the incident light within that time slice to generate a reduced controllable minimum brightness such that the level of gray scale may be increased.

In the image display systems according to the aspects described above, an image with a greater number of gray scales can be displayed without operating the SLM at an excessively fast speed or excessively increasing the number of repetitive operations of the SLM.

These and other objects and advantages of the present invention will no doubt become obvious to those of ordinary skills in the art after reading the following detailed description of the preferred embodiment, which is illustrated in the various drawing figures.

BRIEF DESCRIPTION OF THE DRAWINGS

FIGS. 1A and 1B are functional block diagram and a top view of a portion of a micromirror array implemented as a spatial light modulator for a digital video display system of a conventional display system disclosed in a prior art patent.

DESCRIPTION OF THE PREFERRED EMBODIMENTS

Reference is now made to the above listed Figures for the purpose of describing, in detail, the preferred embodiments of the present invention. The Figures referred to and the accompanying descriptions are provided only as examples of the invention and are not intended in anyway to limit the scope of the claims appended to the detailed description of the embodiment.

Figure 3:
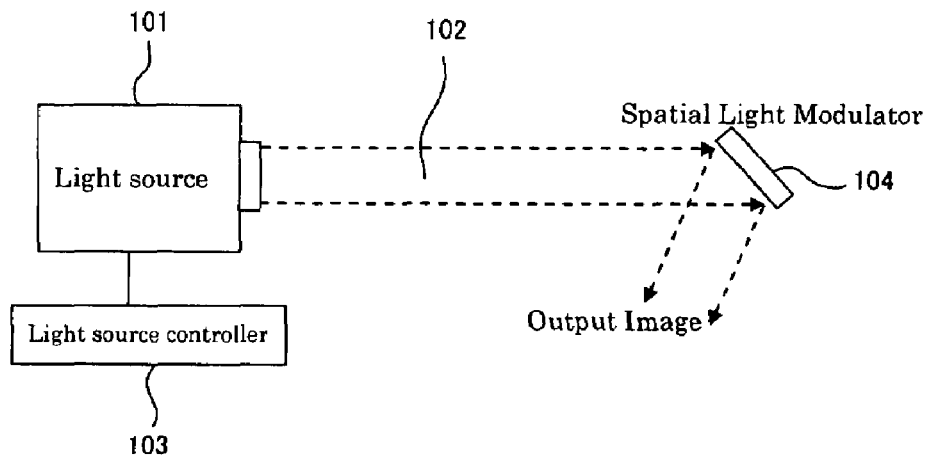
FIG. 3 schematically shows a basic configuration of the image display system according to an embodiment.

FIG. 3 schematically shows a basic configuration of the image display system according to an embodiment of the invention. The image display system includes a light source 101 controlled by a light source controller. 103 The light controller 103 controls the illumination intensity and/or light emission time of illumination light 102 from the light source 101. The display system further includes an SLM (Spatial Light Modulator) 104 having a plurality of pixel elements. The SLM 104 modulates the incident light, which is the illumination light 102, and generating an image display with increased level of controllable gray scales. The light source controller 103 controls the light source 101 during at least one time slice in one frame period. The SLM 104 modulates the micromirrors within that time slice to generate a minimum controllable brightness for increasing the gray scale levels. In this embodiment, the time slice for modulating the micromirrors for adjusting a minimum brightness for controlling a display gray scale is referred to as an MGTS (minimum gray scale time slice).

Figure 4A:
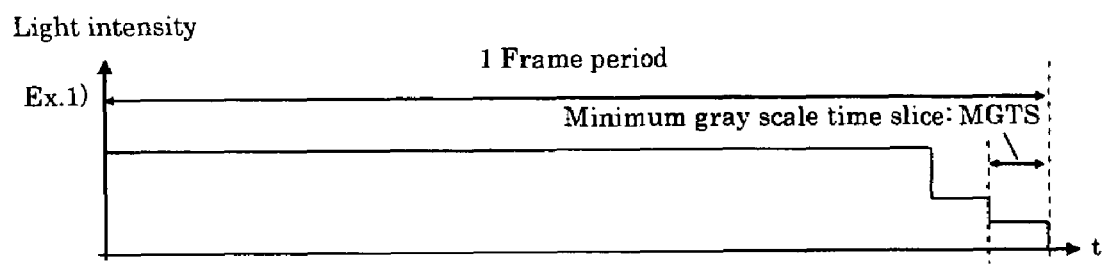
FIG. 4A explains an example of an MGTS.
Figure 4B:
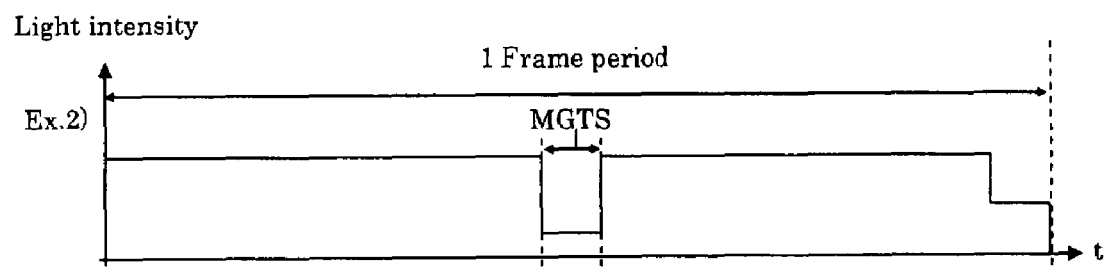
FIG. 4B explains another example of the MGTS.

FIGS. 4A, 4B, 4C, 4D, 4E and 4F are timing diagram for explaining the examples of timing controls of the micromirrors and illumination light intensity in the MGTS. Each of the timing diagrams also shows an example of how the light source controller 103 controls the light source 101 in one frame period. FIGS. 4A and 4B show examples of the MGTS as the time slice for the light source controller 103 to control the light source 101 to project the variable light intensity, i.e., illumination intensity, of the illumination light 102. In the examples, the light intensity of the illumination light 102 is controlled to project a lowest intensity during the MGTS in one frame period. FIG. 4A shows an example of controlling and scheduling the MGTS at the end of one frame period, and FIG. 4B shows an example of controlling and scheduling the MGTS in the middle of one frame period.

Figure 4C:
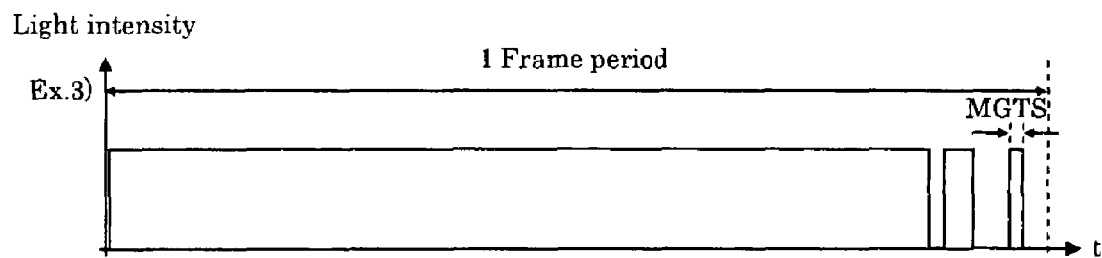
FIG. 4C explains another example of the MGTS.
Figure 4D:
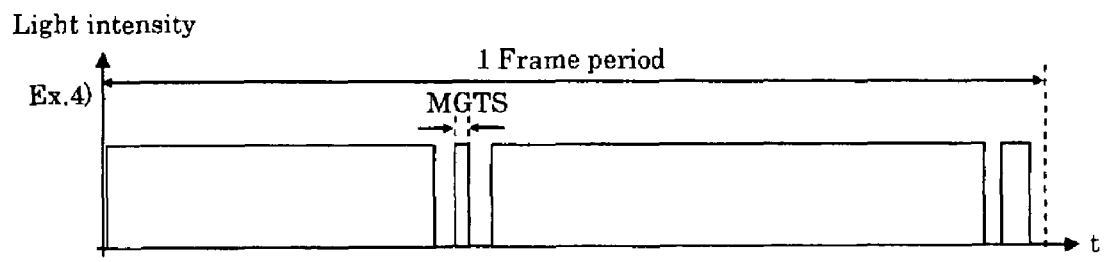
FIG. 4D explains another example of the MGTS.

FIGS. 4C and 4D show examples of the MGTS as the time slice for the light source controller 103 to control the light source 101 to control the light emission to start and end at controllable variable times in projecting the illumination light 102. In the examples, the light emission time duration of the illumination light 102 is controlled as the shortest length of time during the MGTS in one frame period. FIG. 4C shows an example of controlling and scheduling the MGTS at the end of one frame period, and FIG. 4D shows an example of controlling and scheduling the MGTS somewhere in the middle of one frame period.

Figure 4E:
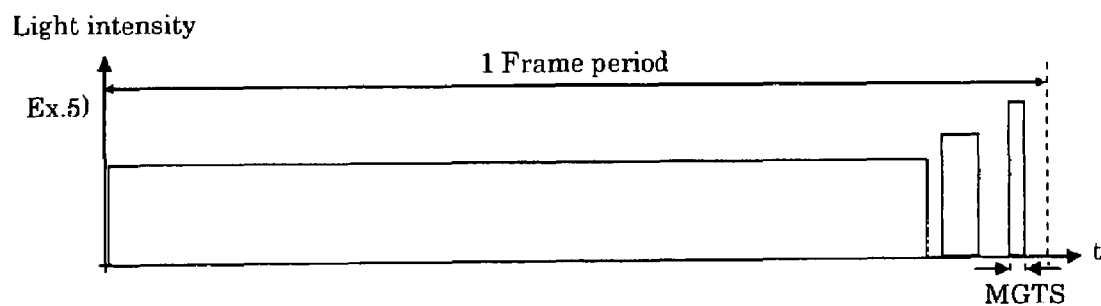
FIG. 4E explains another example of the MGTS.
Figure 4F:
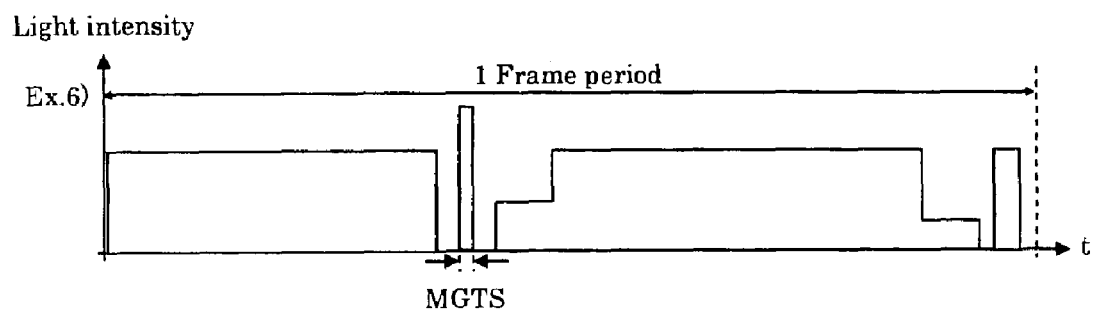
FIG. 4F explains another example of the MGTS.

FIGS. 4E and 4F show examples of the MGTS as the time slice during for the light source controller 103 to control the light source 101 to project a variable light intensity and to start and end the light emission time of the illumination light 102. In the examples, the light intensity of the illumination light 102 is controlled project an illumination light of a highest intensity during the MGTS in one frame period and the light emission time duration of the illumination light 102 is controlled operate at an ON state for a shortest length of time during the MGTS in one frame period. FIG. 4E shows an example of controlling and scheduling the MGTS at the end of one frame period, and FIG. 4F shows an example of controlling and scheduling the MGTS somewhere in the middle of one frame period.

As the light source 101 is controlled to project variable light intensity or to start and end at variably controllable time during the MGTS within a display frame, the number of gray scales of a display image is increased. The image with a greater number of gray scales can be displayed without requiring operating the SLM 104 at an excessively fast speed in order to increase the number of repetitive operations of the SLM 104.

The control of the light source to project variable light intensity and/or to start and end the light emission time at variably control times of the illumination light 102 during the MGTS is not limited to the examples described above. Different control schemes of the light intensity and/or light emission time can be employed as long as they can reduce a minimum controllable brightness that is adjustable to increase the number of gray scales for image display. The scheduled time slots and the number slots for the MGTS in one frame period are also not limited to the examples described above, but other scheduling programs can be applied.

Furthermore, the light intensity and/or the light emission time of the illumination light 102 within the time period of the MGTS and/or the scheduled time slot of the MGTS in one frame period can be changed according to the contents of an output image. When the image display system according to this embodiment includes a plurality of light sources, the above control schemes can be implemented for each of these multiple light sources. For example, when the system includes light sources for RGB colors, the control schemes as described can be implemented for each of the RGB colors.

Figure 5:
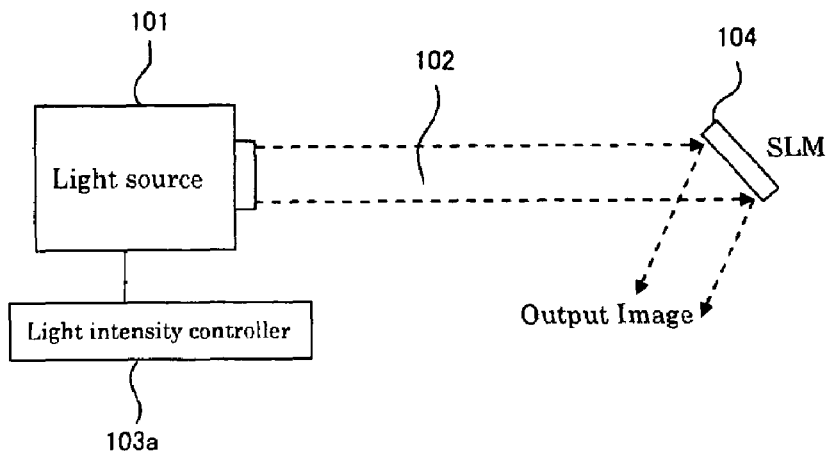
FIG. 5 explains a variation of a light source controller.
Figure 6:
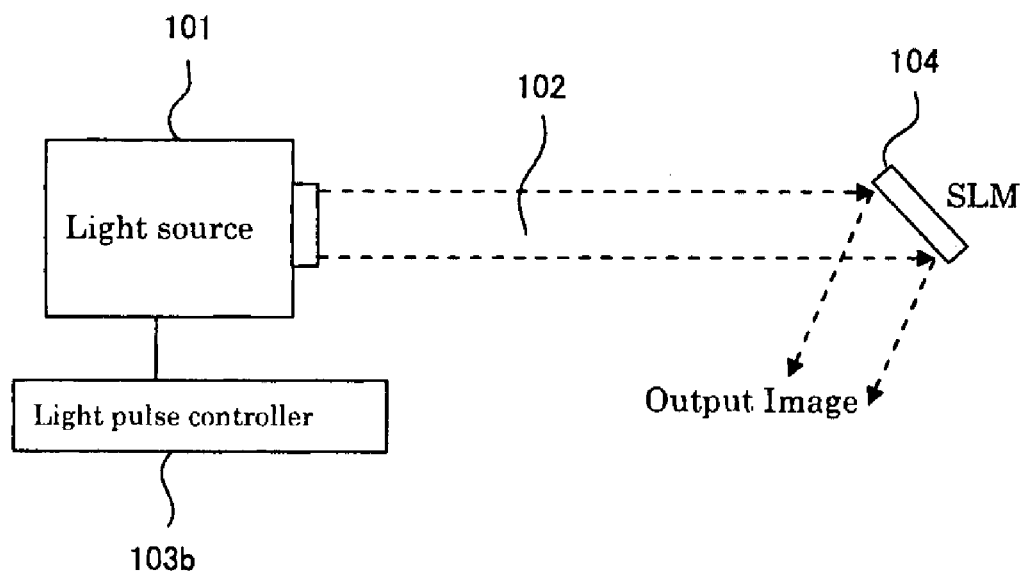
FIG. 6 explains another variation of the light source controller.
Figure 7:
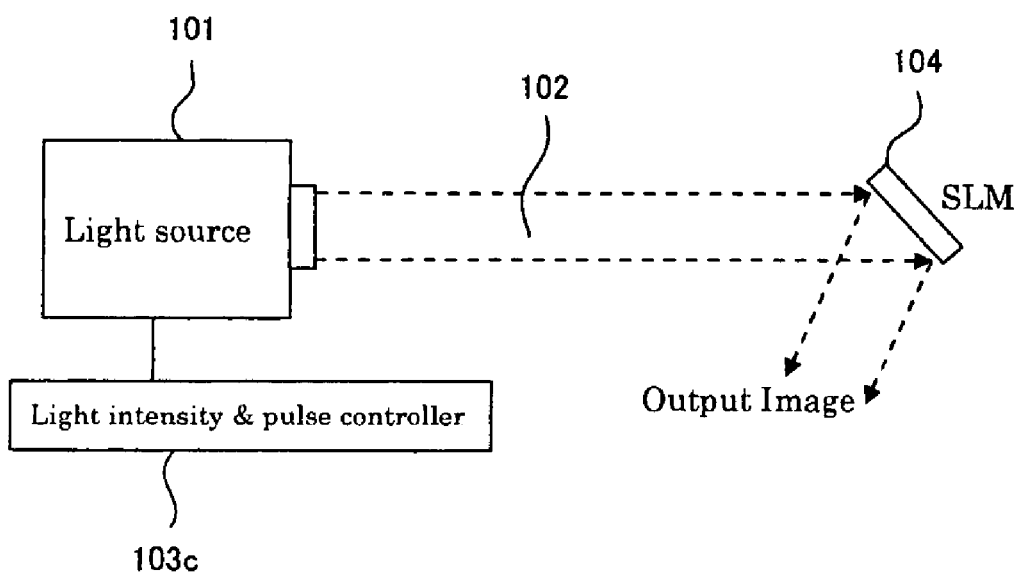
FIG. 7 explains another variation of the light source controller.

When the light source 101 is controlled only for projecting variable light intensity of the illumination light 102 as shown in FIGS. 4A and 4B, the light source controller 103 may be implemented as a light intensity controller. FIG. 5 shows an exemplary embodiment of an illumination intensity control unit 103a that controls the light source 101 to flexibly adjusting the light intensity of the illumination light 102. When the light source 101 is controlled only for scheduling the light emission time of the illumination light 102 as shown in FIGS. 4C and 4D, the light source controller 103 may be implemented with a light pulse controller. FIG. 6 shows an example of a light pulse emission control unit 103b that controls the light source 101 to flexibly adjust the light emission time of the illumination light 102. Hence the light source 101 control both the light intensity and the light emission time of the illumination light 102 as shown in FIGS. 4E and 4F, the light source controller 103 may be implemented with a light intensity & pulse controller. FIG. 7 shows an example of the light source control unit 103c that controls the light source 101 to flexibly adjust the light intensity and the light emission time of the illumination light 102.

Figure 1C:
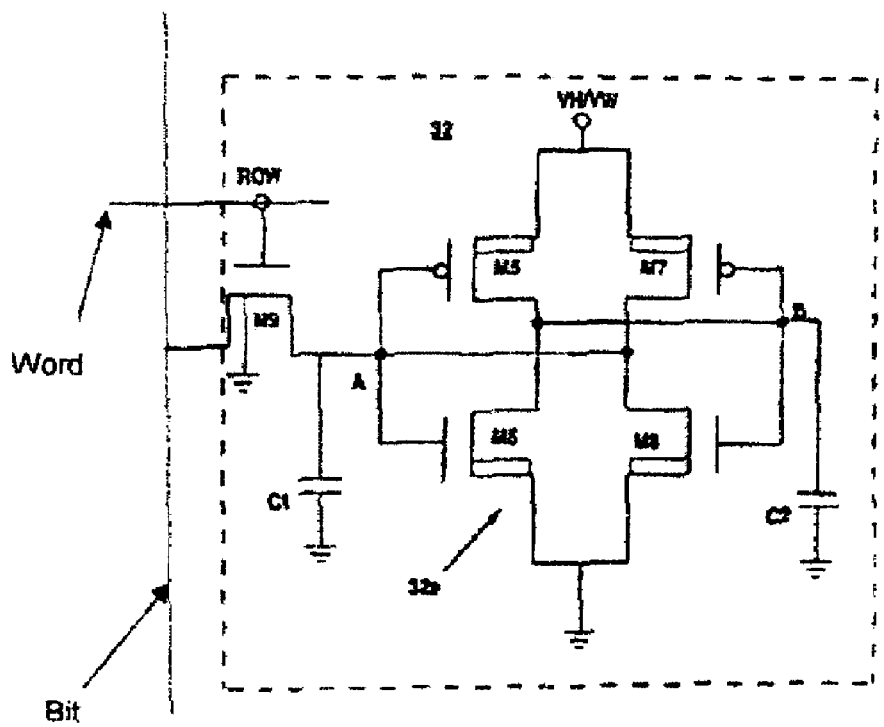
FIG. 1C is a circuit diagram for showing a prior art circuit for controlling a micromirror to position at an ON and/or OFF states of a spatial light modulator.
Figure 1D:
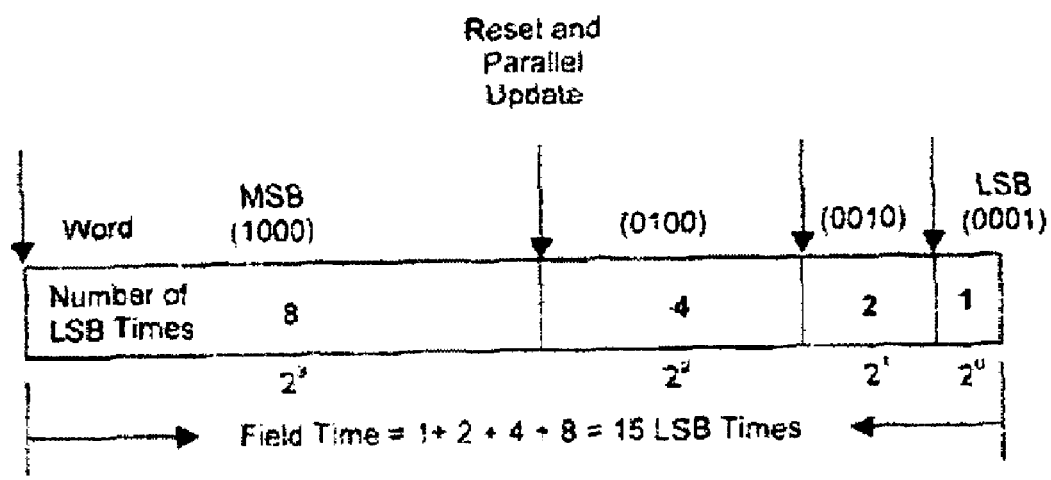
FIG. 1D is diagram for showing the binary time intervals for a four bit gray scale.
Figures 2A, 2B:
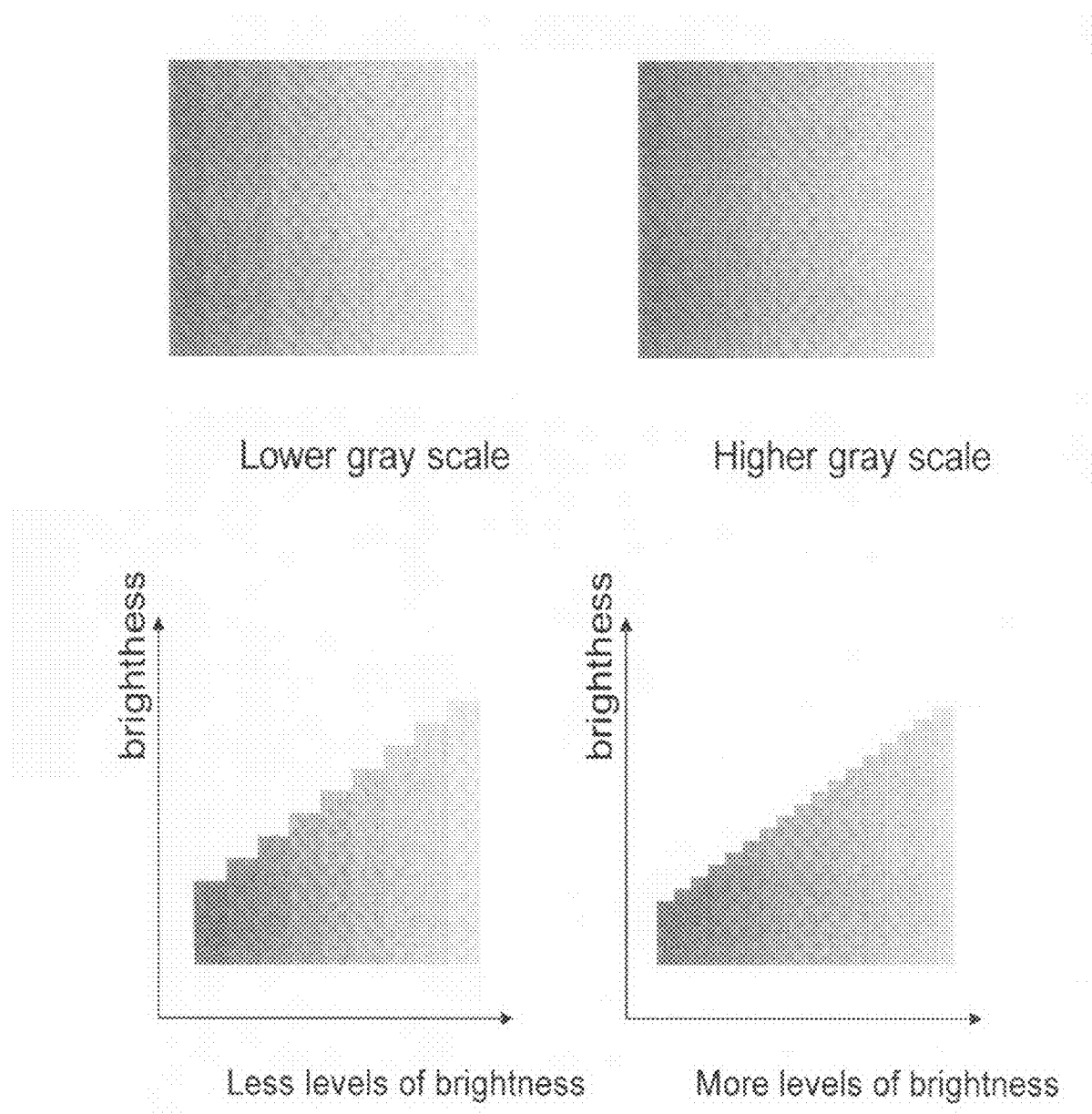
FIG. 2A shows an example of lower gray scales.
FIG. 2B shows an example of higher gray scales.
Figure 8:
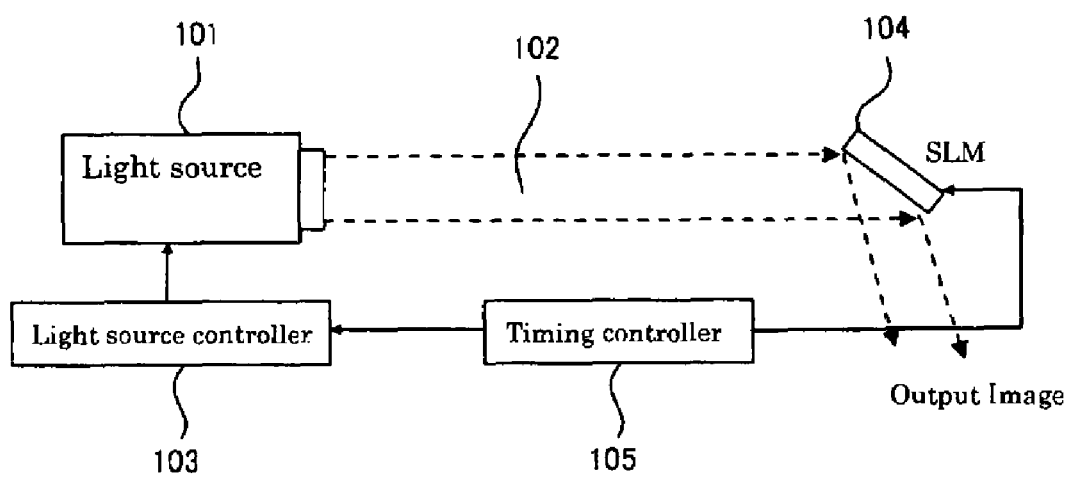
FIG. 8 schematically shows a basic configuration of the image display system according to another embodiment.

FIG. 8 is a schematic diagram for showing a basic configuration of the image display system according to another embodiment of the invention. As shown in FIG. 8, the image display system according to this embodiment includes not only the components shown in FIG. 1 but also includes a timing controller 105 as a timing control unit to control the light source controller 103 and the SLM 104. The light source controller 103 controls the light source 101 during at least one time slice in one frame period. The timing controller 105 controls the light source controller 103 and the SLM 104 in such a way that the start and end timings of that time slice has an option to not coincide with any transition state of any of the pixel elements in the SLM 104. The SLM 104 modulates the micromirrors in that time slice to generate a minimum controllable brightness increment to control the gray scale. In this embodiment, the time slice wherein the micromirrors are modulated by the SLM for generating a minimum increment of gray scale is also referred to as the MGTS (minimum gray scale time slice).

Figure 9A:
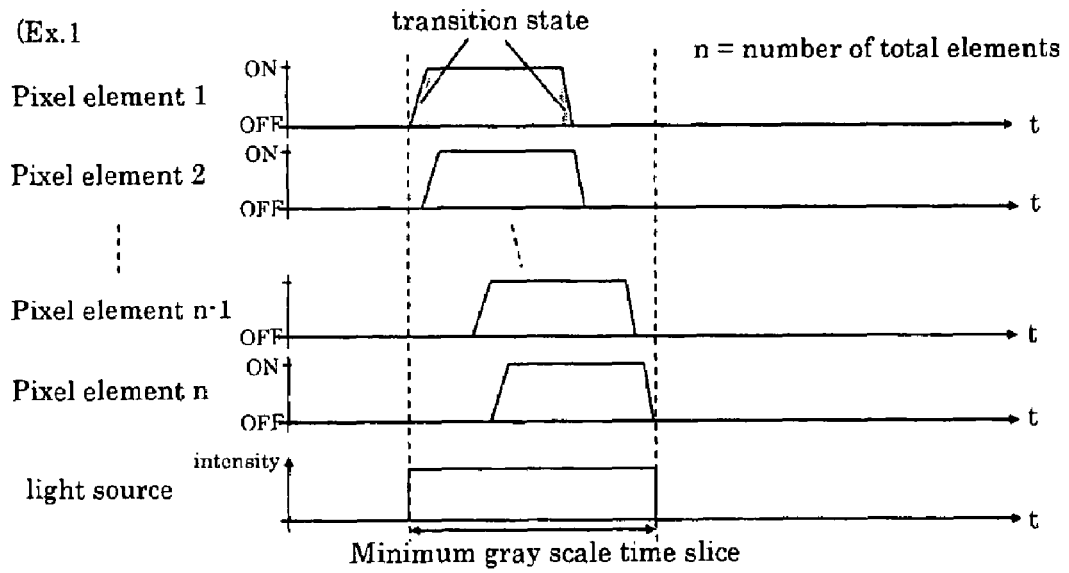
FIG. 9A explains another example of the MGTS.
Figure 9B:
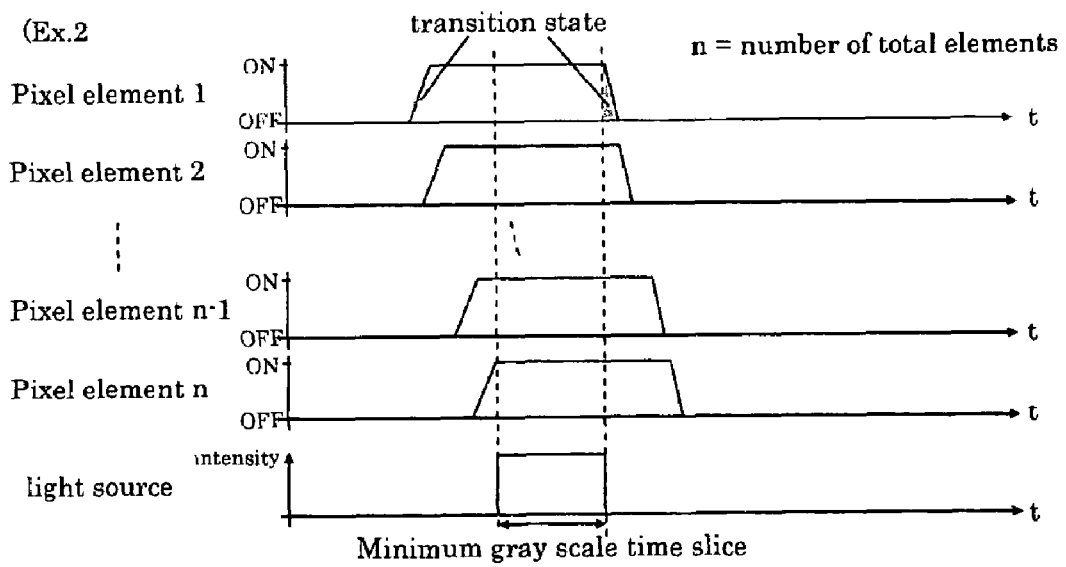
FIG. 9B explains another example of the MGTS.

FIGS. 9A and 9B are timing diagram for explaining different examples of the MGTS. Each of the figures also shows an example of how to control a pixel element in the SLM 104 and how to control the light source 101. When the SLM 104 has a large number of pixel elements, an attempt to simultaneously operate all the pixel elements in a synchronized manner is unlikely to be successful. As shown in FIGS. 9A and 9B, practically, the micromirrors will be operated out of sync from each other because the operation timings of the pixel elements are all different. In such a case, if the start and end timings of the MGTS coincide with the transition states of the pixel elements in the SLM 104, the gray scales for the pixel elements as that modulated by the micromirrors is also different from each other. It is noted that the time of a transition of state is the time when the pixel element is changing its state from OFF to ON or from ON to OFF (see the transition of states indicated by the gray portions in FIGS. 9A and 9B).

To address this problem, in the example shown in FIG. 9A, the MGTS is a minimum period within the period when the pixel element that starts operating at the earliest timing, i.e., pixel element 1, to the time when the last pixel element, i.e., pixel element n, ends its transition of states. In the example shown in FIG. 9B, the MGTS is scheduled within a maximum period that includes no transition state period of the pixel elements (see the transition states indicated by the gray portions in FIG. 9B). When there are no overlaps between the start and end timings of the MGTS with any transition state of the pixel elements in the SLM 104, desired gray scales could be accurately controlled by modulating the micromirrors for all of the pixel elements.

Figure 10:
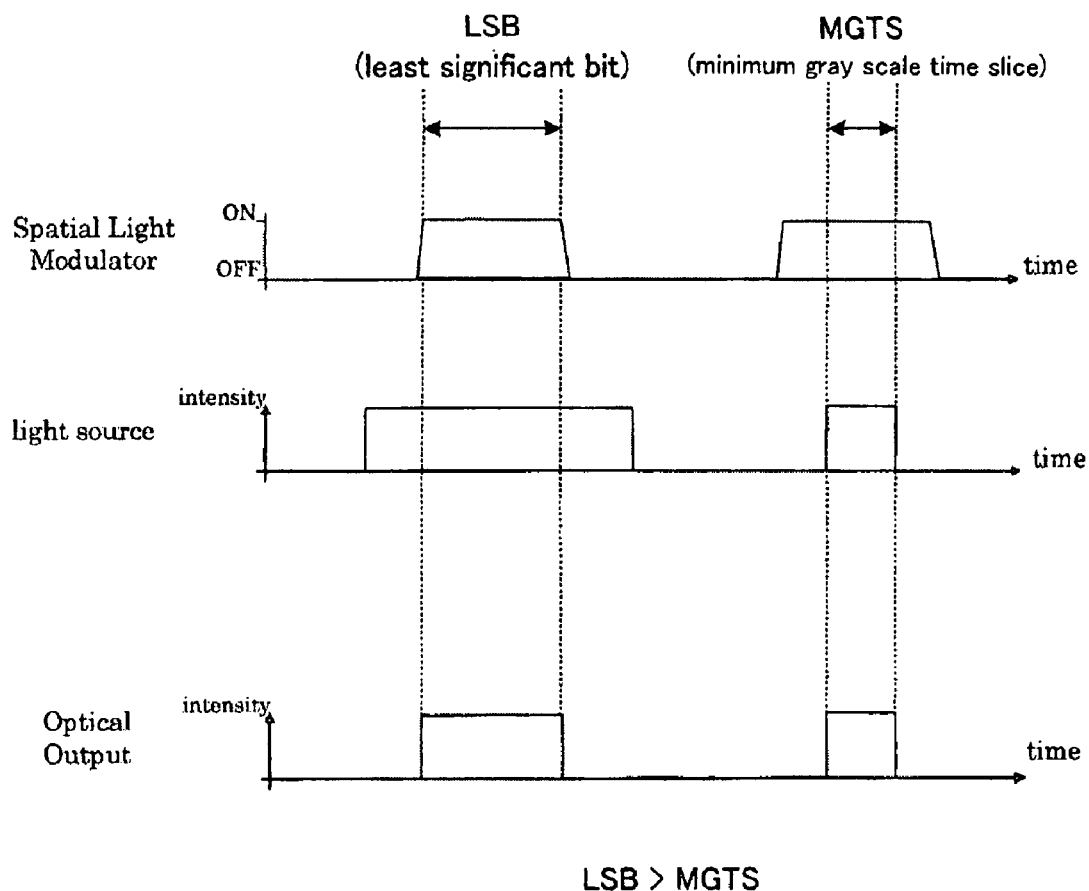
FIG. 10 explains an example in which the MGTS is made shorter than LSB (least significant bit) time.

FIG. 10 is a timing diagram for explaining an example of scheduling the MGTS shown in FIG. 9B. The MGTS is made shorter than the LSB (least significant bit) time. It is noted that the LSB time is a minimum time during which all the pixel elements in the SLM 104 can be turned ON. The top timing diagram of FIG. 10 shows an example of how to control the SLM 104 for all of the pixel elements in the SLM 104. The middle timing diagram of FIG. 10 shows an example of how to control the light source 101. The bottom timing-diagram of FIG. 10 shows an example of optical output corresponding to the variations of the pixel element transitions and the light intensity of the light source.

As shown in FIG. 10, since an MGTS is able to modulate the micromirrors with a length of time shorter than the pulse width corresponding to a LSB, the number of gray scales can be increased while the light source 101 keep emitting light. Additional flexibilities are achieved when compared to the display systems where only the operation of the SLM 104 is used to modulate the micromirrors in order to generate increased number of gray scales. For these reasons, the number of gray scales can therefore be increased without operating the SLM at an excessively fast speed or excessively increasing the number of repetitive operations of the SLM.

Although the image display systems are described according to the above embodiments of the invention, additional embodiments of the image display systems can also be configured as follows. In another exemplary embodiment, the time duration of the MGTS can be implemented as a minimum time duration for operating all the pixel elements in the SLM 104 to generate an image display with additional number of gray scales. By using the minimum time duration for operating all the pixel elements in the SLM 104, it is possible to efficiently use the energy of the light source 101. The number of gray scales of an output image is increased without reduction in maximum brightness. The SLM 104 can be implemented as a micro-mirror device having micro-mirror elements for modulating the pixel elements. Alternatively, an SLM ma be implemented by applying the liquid crystal technology and configured as an LCD (Liquid Crystal Display) and LCOS (Liquid crystal on silicon) display systems.

When a micro-mirror device is implemented for carrying out the modulation function of the SLM 104, the micromirror device can be variably controlled to provide reflected light with the amount of reflecting light according to one of ON, OFF and intermediate levels of the micromirrors. In this way, additional control of the amount of reflected light is achieved in addition to the control of the MGTS for adjusting the illumination intensity and/or the light emission time of the illumination light 102. Thus, the number of gray scales of the display image can be further increased. The micro-mirror device when implemented, as the SLM 104 can be further configured to move with oscillating operation or partial positioning operation. The micromirror operations are used to control the amount of reflected light from each micro-mirror element to modulate the display light in an intermediate level in addition to the ON and OFF states.

Figure 11:
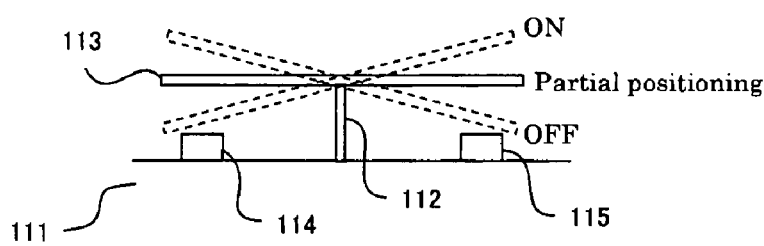
FIG. 11 schematically shows a cross section of a micro-mirror element in operation.
Figure 12:
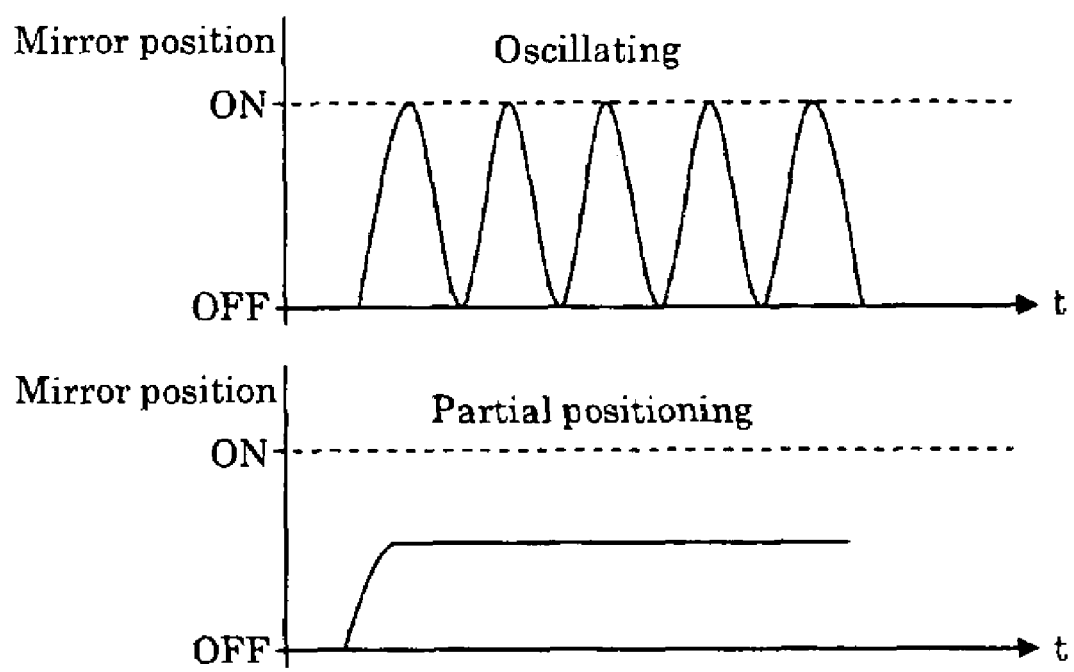
FIG. 12 shows oscillating operation and partial positioning operation as mirror operation of the micro-mirror element.

FIGS. 11 and 12 diagrams for showing examples to explain the operations of a micro-mirror element when the amount of reflected light is controlled to be an intermediate level. FIG. 11 schematically shows a cross section of a micro-mirror element to illustrate the operation of the micromirror element, and FIG. 12 shows oscillating operation and partial positioning operation as the mirror operation. The micro-mirror element in this example includes a mirror 113 supported on a hinge 112 formed on a substrate 111 for flexibly tilt to different deflecting angles as shown in FIG. 11. An ON stopper 114 and an OFF stopper 115 are symmetrically disposed on two opposite sides of the hinge 112 formed on the substrate 111.

An ON electrode (not shown) is provided under the ON stopper 114. A predetermined potential applied to the ON electrode produces a coulomb force to draw and tilt the mirror 113 until the micromirror 113 abuts the ON stopper 114. This position of the mirror 113 is referred to as an ON position to deflect incident light to a projection light path for controlling the amount of reflected light at an ON level. Similarly, an OFF electrode (not shown) is provided under the OFF stopper 115. A predetermined potential applied to the OFF electrode produces a coulomb force to draw and tilt the mirror 113 until the mirror abuts the OFF stopper 115. This position of the mirror 113 is referred to as an OFF position to deflect incident light away from the projection light path for controlling the amount of reflected light at an OFF level.

Instead of applying a predetermined potential to the ON electrode or the OFF electrode, the potential application can be turned off and that causes the elastic force of the hinge 112 to initiate a free oscillation movement of the mirror 113. This allows oscillation operation of the mirror 13, as shown in the upper part of FIG. 12. The mirror 113 repeatedly moves back and forth between the ON and OFF positions. It is therefore possible to deflect incident light in time-variant directions between the direction of the projection light path and a direction outside the projection light path. The intermediate state thus allows a control of the amount of reflected light when the mirror is operated in an intermediate level.

Alternatively, by applying a predetermined potential to the ON electrode and/or the OFF electrode, the mirror 113 is controlled to move to a partial deflection angular position relative to a horizontal direction along the surface of the substrate 111. This position of the mirror 113 is referred to as a partial deflection position. This allows partial deflection operation of the mirror 113, as shown in the lower part of FIG. 12. The mirror 113 is fixed at the partial deflection position. It is therefore possible to deflect incident light in a fixed direction between the direction of the projection light path and a direction totally away from the projection light path to enable a control of the amount of reflected light according to an intermediate level of the deflection light.

Figure 13:
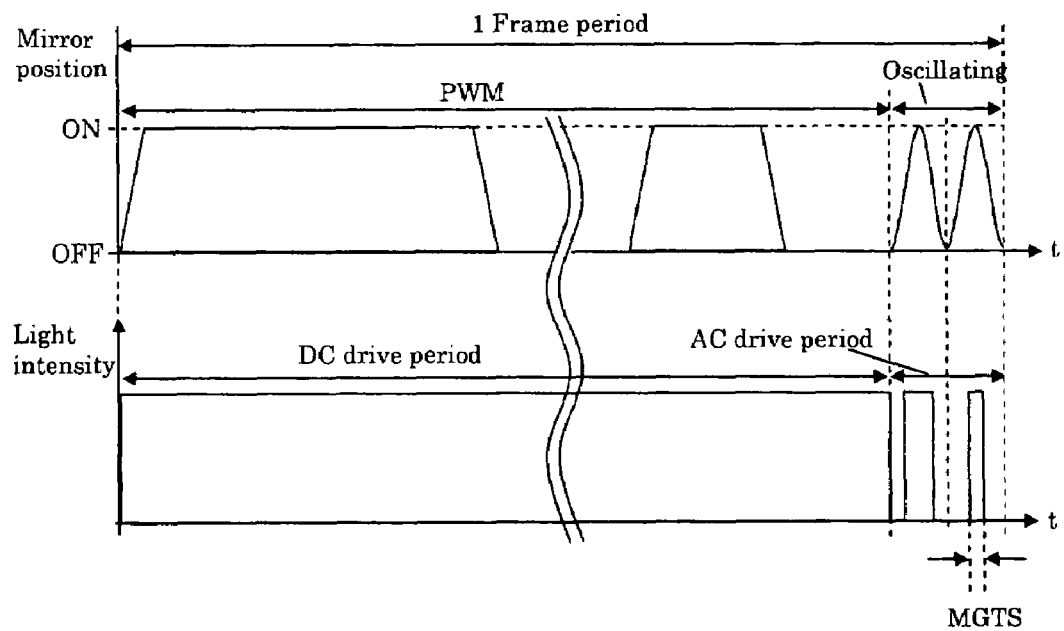
FIG. 13 shows an example of how a tiling controller controls a micro-mirror device and a light source controller (a light source via the light source controller).

When the micro-mirror device is applied as the SLM 104, it is also possible to apply the following control schemes. The micro-mirror device performs the PWM (Pulse Width Modulation) operation to control and modulate the oscillating operation of the micromirrors in one frame period. The light source controller 103 controls the light source 101 in such a way that the light source 101 is DC-driven and AC-driven in one frame period. The timing controller 105 controls the light source controller 103 and the micro-mirror device in such a way that the period during which the micro-mirror device performs the PWM operation is synchronized with the period during which the light source 101 is DC-driven and the period during which the micro-mirror device performs the oscillating operation is synchronized with the period during which the light source 101 is AC-driven. By applying such a control process, FIG. 13 further shows an example of how the timing controller 105 controls the micro-mirror device and the light source controller 103 (the light source 101 via the light source controller 103). As shown in FIG. 13, the timing controller 105 controls the micro-mirror device and the light source controller 103 in such a way that in one frame period, the period during which each micro-mirror element in the micro-mirror device performs the PWM operation is synchronized with the period during which the light source 101 is DC-driven. The period when each micro-mirror element is controlled to oscillate is synchronized with the period when the light source 101 is AC-driven. The example of control shown in the lower part of FIG. 13 is the same example as that shown in FIG. 4C for illustrating how the light source controller 103 controls the light source 101. By synchronizing the operation of the micro-mirror device with the light emission of the light source 101, the energy of the light source 101 can be more efficiently used to generate image display with additional number of gray scales. In the image display systems according to the above embodiments, it is also possible to apply a laser light source, an LED light source, or the combination of a laser light source and an LED light source as the light source 101 further described in alternate embodiments below.

Figure 14:
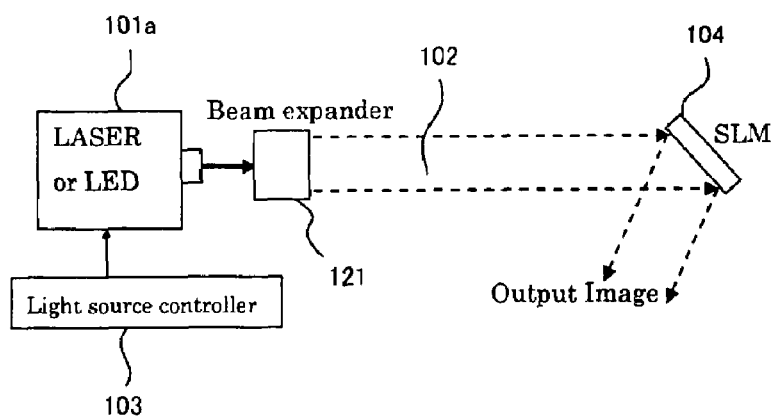
FIG. 14 schematically shows an exemplary configuration of the image display system when one laser light source or LED light source is applied as the light source.
Figure 15:
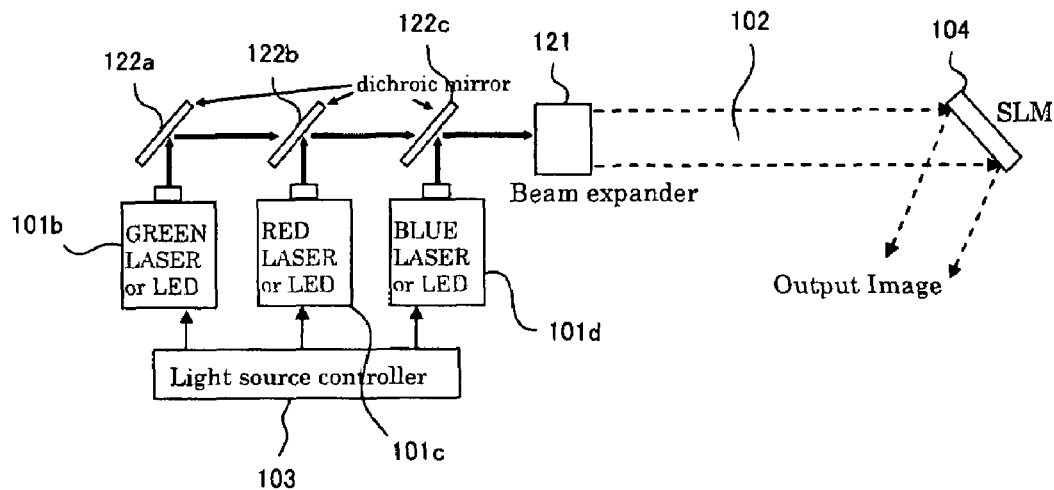
FIG. 15 schematically shows an exemplary configuration of the image display system when three laser light sources or LED light sources are applied as the light source.
Figure 16:
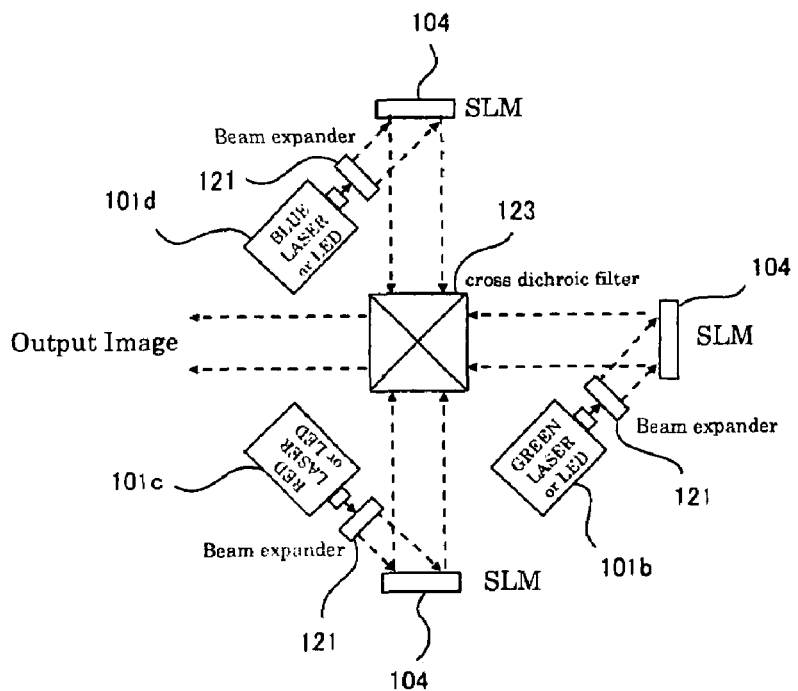
FIG. 16 schematically shows an exemplary configuration of the image display system when the configuration shown in FIG. 14 is provided for each of the colors, green, red and blue.

FIGS. 14, 15 and 16 schematically show exemplary configurations of the image display system when a laser light source or an LED light source is applied as the light source 101. Specifically, FIG. 14 schematically shows an exemplary configuration of the image display system when one laser light source or LED light source is applied as the light source 101. In this exemplary embodiment, a beam expander 121 is disposed between the light source and the SLM 104. The light source 101*a* is either a laser light source or an LED light source. The beam expander 121 is implemented for enlarging the beam diameter of the laser light or LED light from the light source 101*a*. The light source 101*a* and the beam expander 121 are used to provide illumination light 102 incidents on the SLM 104.

FIG. 15 schematically shows an exemplary embodiment of the image display system when three laser light sources or LED light sources are applied as the light source 101. In this configuration, in correspondence with three light sources 101*b*, 101*c* and 101*d*, which are either laser light sources or LED light sources of green, red and blue, there are provided three dichroic mirrors 122*a*, 122*b* and 122*c*. The dichroic mirrors transmit or reflect the laser light beams or LED light beams. A beam expander 121 is provided between the three dichroic mirrors 122*a*, 122*b* and 122*c* and the SLM 104. In this example, the dichroic mirror 122*a* reflects green light, which is the laser light or LED light from the light source 101*b*. The dichroic mirror 122*b* transmits the green light and reflects red light, which is the laser light or LED light from the light source 101*c*. The dichroic mirror 122*c* transmits the green light and the red light and reflects blue light, which is the laser light or LED light from the light source 101*d*. Then, the green, red and blue light beams from the dichroic mirror 122*c* pass through the beam expander 121, where their beam diameters are enlarged. In this exemplary configuration, the three light sources 101*b*, 101*c* and 101*d*, the three dichroic mirrors 122*a*, 122*b* and 122*c* as well as the beam expander 121 are thus used to provide illumination light 102 incidents on the SLM 104.

FIG. 16 schematically shows an exemplary embodiment of the image display system when the display system as shown in FIG. 14 is provided for each of the colors, green, red and blue. In this exemplary embodiment, although not shown, one light source controller 103 may be provided to control all the three light sources 101*b*, 101*c* and 101*d* for the colors, green, red and blue, or one light source controller 103 may be provided for each of the light sources. In this exemplary embodiment, green, red and blue output images from the respective SLMs 104 are outputted through a cross dichroic filter 123 to the same light path.

Each of the image display systems according to the above embodiments may be configured as a single-panel image display system with one SLM. Or the display system may be configured as a multiple-panel image display system with a plurality of SLMs, as described above. The following description explains an exemplary optical configuration in a single-panel image display system and an exemplary optical configuration in a multiple-panel image display system.

Figure 17:
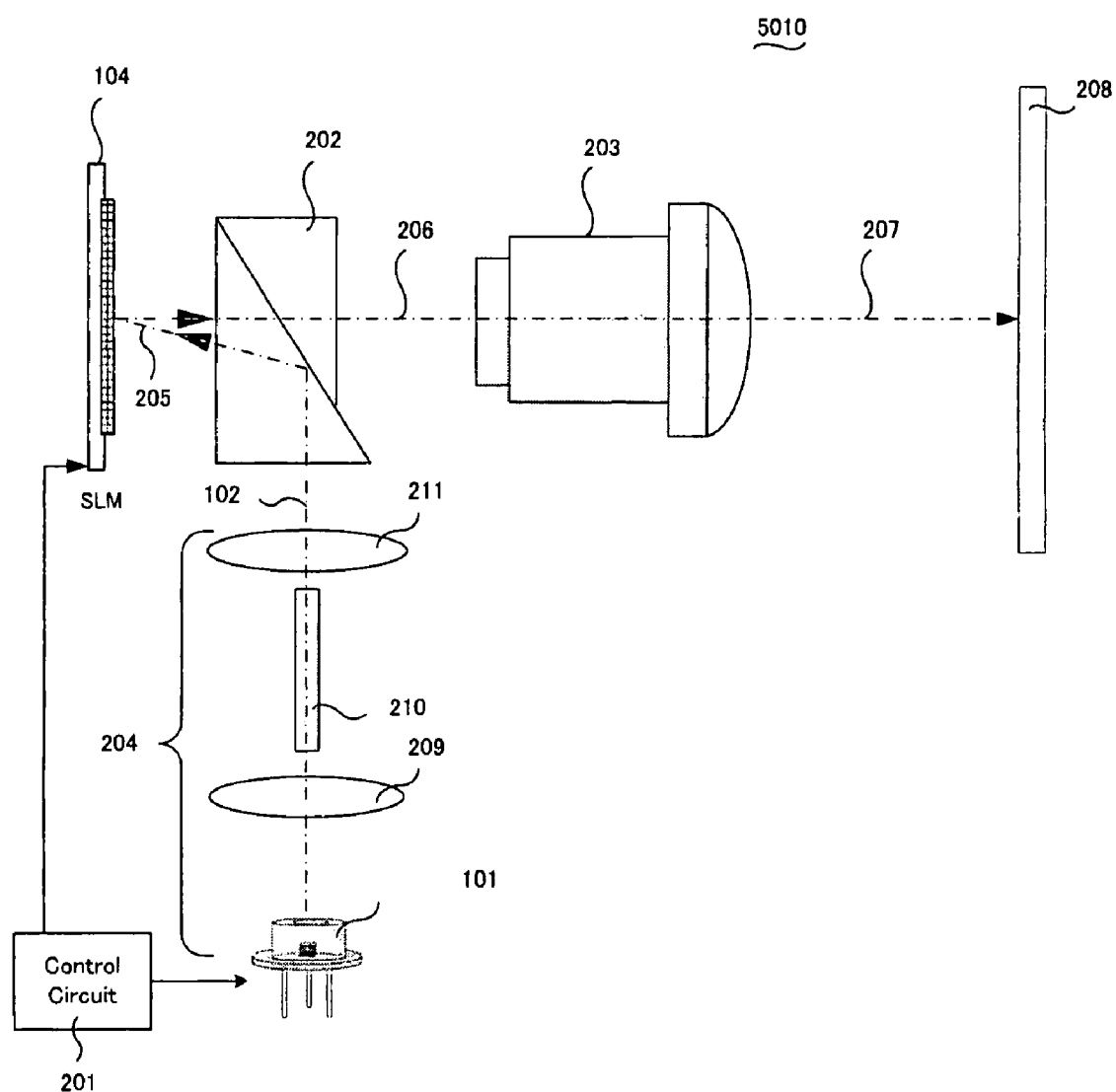
FIG. 17 shows an exemplary optical configuration in a single-panel image display system.

FIG. 17 is a diagram for conceptually showing the configuration of the color display system according to one embodiment of the invention. As illustrated in FIG. 17, the color display system 5010 includes one spatial light modulator (SLM) 104, a control unit 201, a TIR prism (Total Internal Reflection prism) 202, a projection optical system 203, a light source optical system 204 and a control unit 210. The color display system 5010 is generally referred to as a single-panel color display system 5010 because the display system includes a single spatial light modulator 104. The spatial light modulator 104 and the TIR prism 202 are disposed on the optical axis of the projection optical system 203. The light source optical system 204 is disposed in such a way that its optical axis is perpendicular to the optical axis of the projection optical system 203. The TIR prism 202 allows the illumination light 102 projected from the light source optical system 204 disposed by the side of the TIR prism 202 to project an incident light 205 on the spatial light modulator 104 at a predetermined oblique angle. The reflected light 206 is perpendicularly reflected off the spatial light modulator 104 to pass through the TIR prism 202 into the projection optical system 203. The projection optical system 203 projects the reflected light 206 transmitted from the spatial light modulator 104 through the TIR prism 202 as the projection light 207 onto a screen 208 or a similar image display surface or panel. The light source optical system 204 includes a variable light source 101 that produces the illumination light 102, a collector lens 209 that focuses the illumination light 102, a rod-like collector 210, and a collector lens 211. The variable light source 101, the collector lens 209, the rod-like collector 210 and the collector lens 211 are sequentially disposed on the optical axis of the illumination light 102 that exits from the variable light source 101 and incident on the side of the TIR prism 202. In the color display system 5010, the one spatial light modulator 104 is used to achieve color display on the screen 208 in a color sequential manner. The variable light source 101 includes a red laser light source 101*c*, a green laser light source 101*b* and a blue laser light source 101*d*. The emission states of the light sources are independently controlled. One frame of display data is divided into a plurality of sub-fields (three sub-fields corresponding to R/G/B (Red/Green/Blue) in this case), and the red laser light source 101*c*, the green laser light source 101*b* and the blue laser light source 101*d* are turned on in a time-series manner during the time slots corresponding to the respective color sub-fields.

Also in the single-panel color display system 5010 illustrated in FIG. 17, the control unit 201 controls the modulating operations of the variable light source 101 and micromirrors 113 in such a way that the display timings for the R/G/B colors in one frame are matched with each other as closely as possible. The matched display times thus achieving a high-performance color display system 5010 without image quality degradation due to the problems of color breakup, false contours and other similar problems.

Figure 18A:
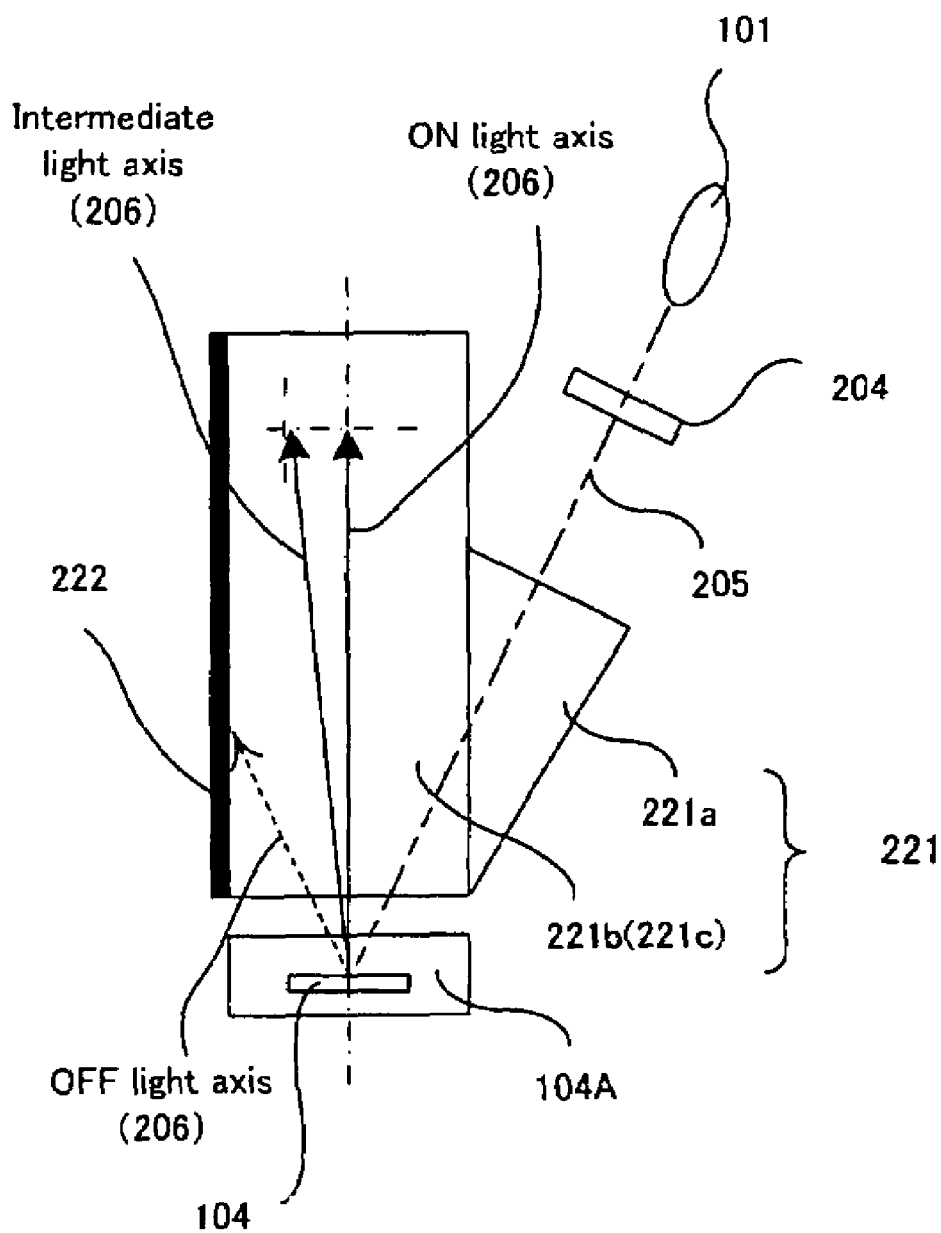
FIG. 18A is a side view showing an exemplary optical configuration in a double-panel image display system.
Figure 18B:
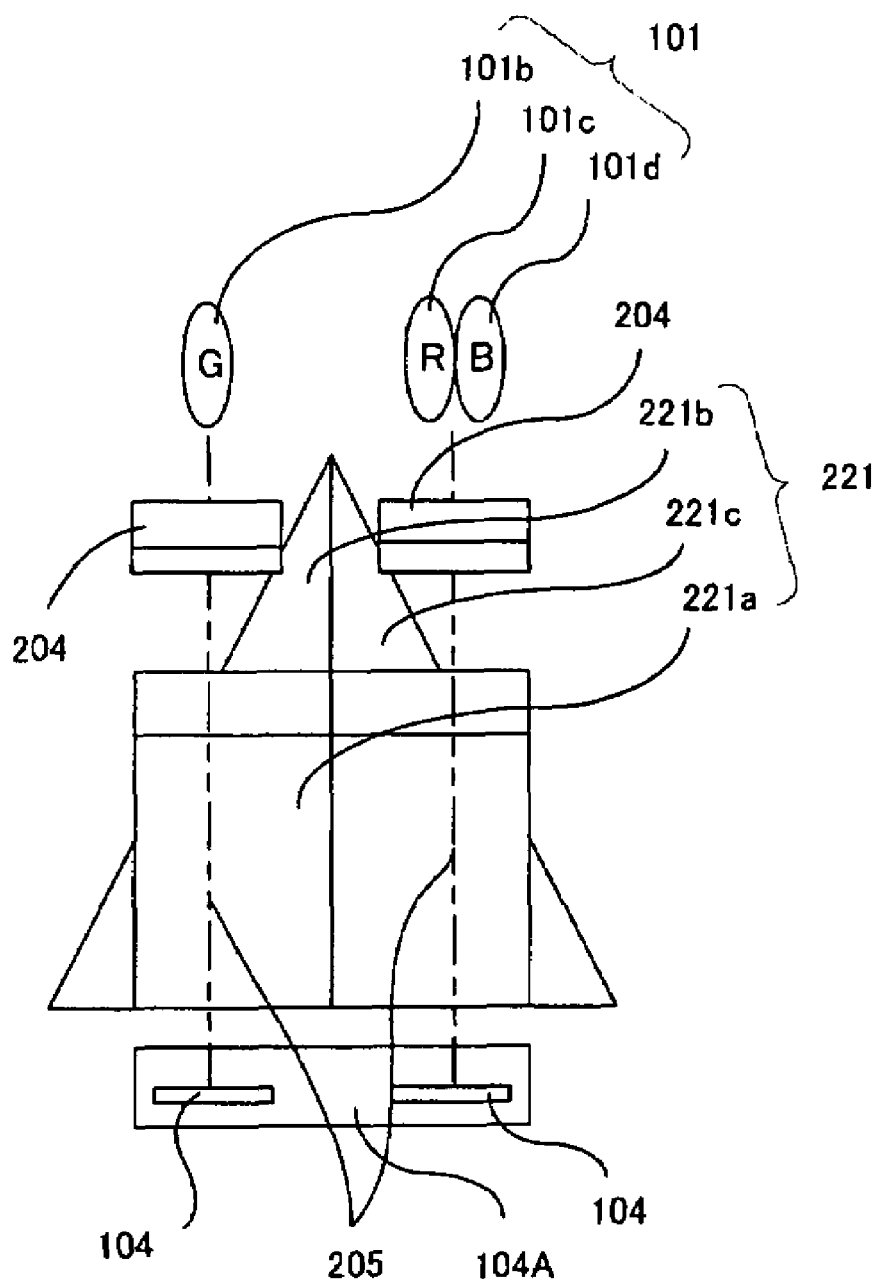
FIG. 18B is a front view showing the exemplary optical configuration in the double-panel image display system.
Figure 18C:
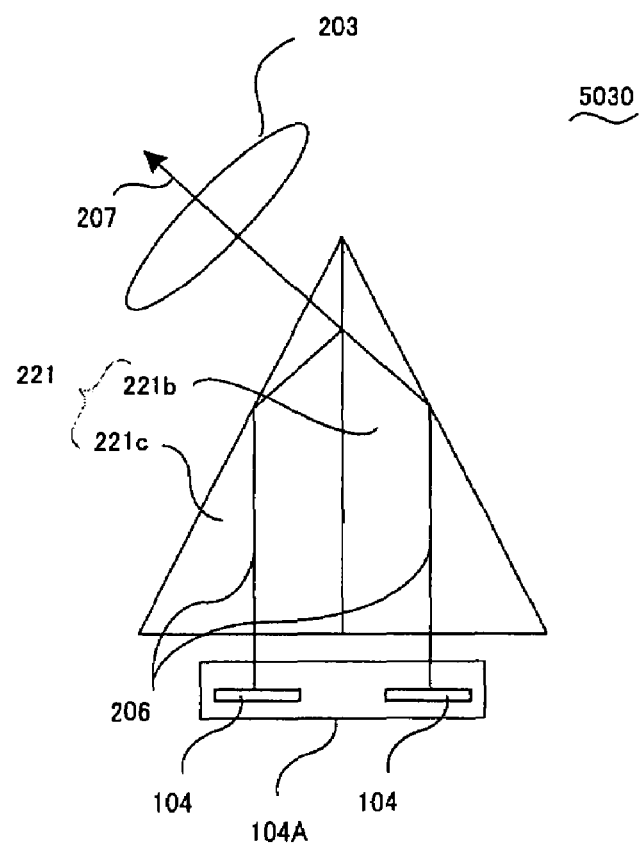
FIG. 18C is a rear view showing the exemplary optical configuration in the double-panel image display system.
Figure 18D:
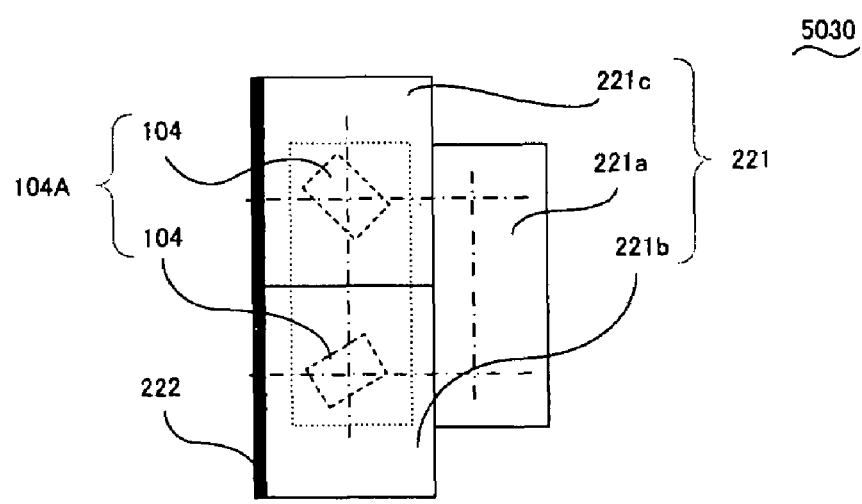
FIG. 18D is a plan view showing an exemplary optical configuration in the double-panel image display system.

FIGS. 18A, 18B, 18C and 18D are configuration diagrams of the optical system of a color display system 5030 using a plurality of spatial light modulators 104. FIG. 18A is a side view of the combination optical system according to an exemplary embodiment of the present invention. FIGS. 18B, 18C and 18D show a front view, a rear view and a top plan view of the combination optical system, respectively. The optical system according to the present embodiment includes a device package 104A having a plurality of spatial light modulators 104 integrally mounted, a color combination optical system 221, a light source optical system 204, and a variable light source 101. Each of the plurality of spatial light modulators 104 mounted in the device package 104A is fixed in such a way that each side of the rectangular contour of the spatial light modulator 104 is inclined at about 45 degrees in the horizontal plane to each side of the device package 104A having a similar rectangular contour.

The color combination optical system 221 is disposed above the device package 104A. The color combination optical system 221 is formed of right triangular column prisms 221*b* and 221*c*, joined to each other into a substantially equilateral triangular column by joining the surfaces containing the longer sides of the right triangles, and a right triangular column light guide block 221*a*, the oblique surface of which joined to the side surfaces of the prisms 221*b* and 221*c* with the bottom side orienting upward. A light absorber 222 is provided on the side surfaces of the prisms 221*b* and 221*c* opposite to the side surfaces on which the light guide block 221*a* is attached.

The light source optical system 204 for a green laser light source 101*b* and the light source optical system 204 for a red laser light source 101*c* and a blue laser light source 101*d* with their optical axes perpendicular to the bottom of the light guide block 221*a* are disposed above the bottom of the light guide block 221*a*. An Illumination light 102 is projected from the green laser light source 101*b* and passes through the light guide block 221*a* and the prism 221*b* as illumination light 205 and is incident on one of the spatial light modulators 104 situated immediately under the prism 221*b*. An Illumination light 102 is projected from the red laser light source 101*c* and the blue laser light source 101*d* and passes through the light guide block 221*a* and the prism 221*c* as illumination light 205 and is incident on the other spatial light modulator 104 situated immediately under the prism 221*c*.

The red and blue illumination light 205 incident on the spatial light modulator 104 is reflected as reflected light 206 in the prism 221*c* to an upward vertical direction when the micromirror 113 is turned ON, then reflected off the outer side surface of the prism 221*c* and the joined surface in this order, enters a projection optical system 203, and exits as projection light 207. The green illumination light 205 incident on the spatial light modulator 104 is reflected as reflected light 206 in the prism 221*b* to an upward vertical direction when the micromirror 113 is turned ON, then reflected off the outer side surface of the prism 221*b* and follows the same light path as that of the red and blue reflected light 206 to enter the projection optical system 203, and exits as projection light 207.

The micromirror device according to the present embodiment thus has at least two modules of the spatial light modulator 104 built in one device package 104A. One module is irradiated only with the incident light 205 from the green laser light source 101*b*. The other module of the spatial light modulator 104 is irradiated with the incident light 205 from at least one of the red laser light source 101*c* and the blue laser light source 101*d*. The modulated light beams modulated in the two modules of the spatial light modulators 104 are collected in the color combination optical system 221 as described above. The modulated light is then expanded in the projection optical system 203 and projected on a screen 208 or the like as the projection light 207.

Figure 19:
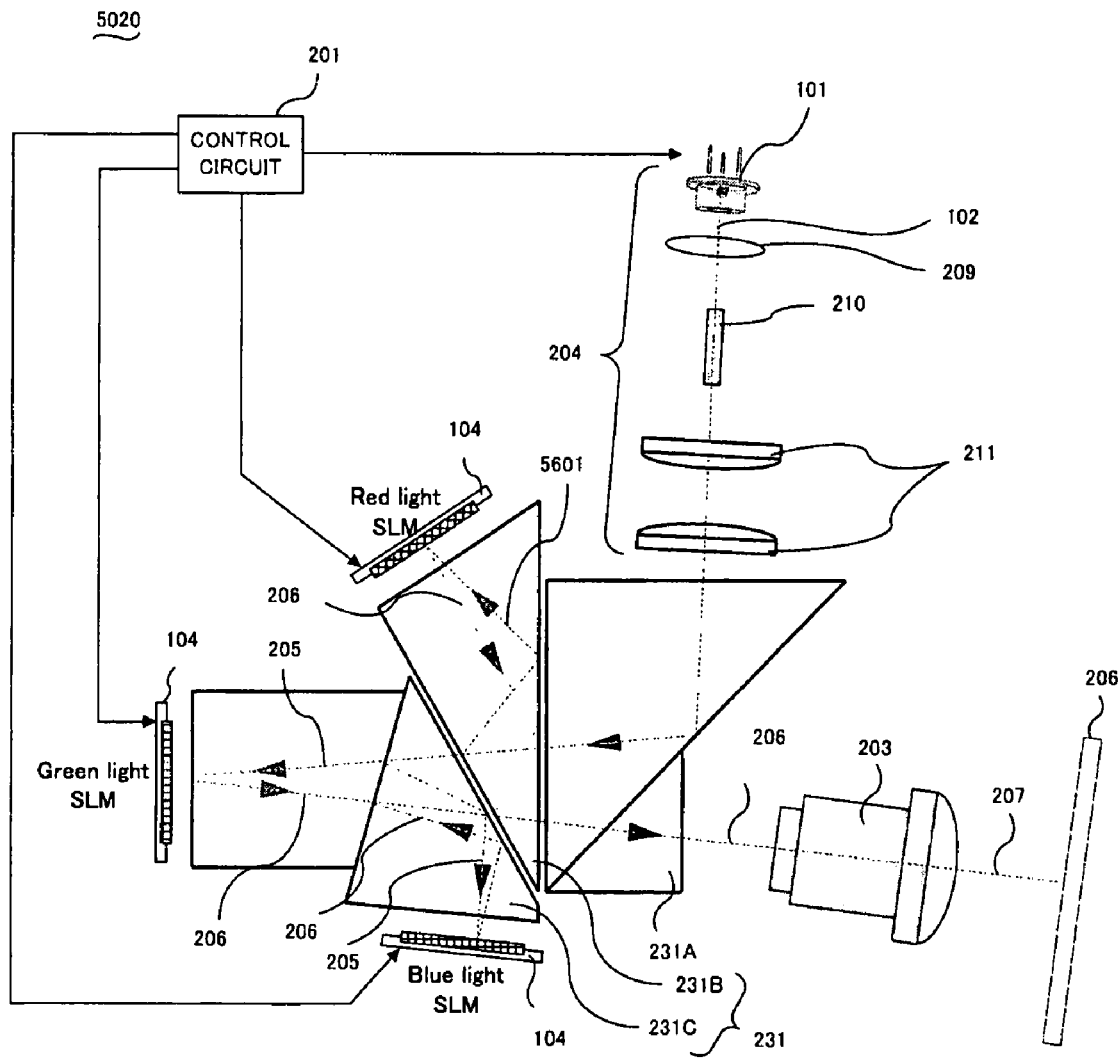
FIG. 19 shows an exemplary optical configuration in a triple-panel image display system.

FIG. 19 is a diagram for showing the concept of a configuration for controlling the color display system according to another embodiment of the invention. The color display system 5020 includes a plurality of spatial light modulators 104. The display system further includes a light separation and combination optical system 231 disposed between a projection optical system 203 and the individual spatial light modulators 104. The light separation and combination optical system 231 includes a plurality of TIR prisms 231A, 231*b* and 231C. The TIR prism 231A serves to guide illumination light 102 projected from the side of the optical axis of the projection optical system 203 toward the spatial light modulators 104 as incident light 205. The TIR prism 231*b* serves to separate red (R) light from the incident light 205 coming through the TIR prism 231A, allow the red light to be incident on the spatial light modulator 104 for red light, and guide reflected light 206 to reflect from the SLM 104 to the TIR prism 231A.

Similarly, the TIR prism 231C separates the blue (B) and green (G) light from the incident light 205 coming through the TIR prism 231A to allow these lights to project on the spatial light modulators 104 for blue and green light, and then guide the reflected light 206 reflected from the SLM 104 to the TIR prism 231A. Therefore, the spatial light modulating operations for the three colors R/G/B are simultaneously carried out at the three spatial light modulators 104, and the resultant modulated, reflected light 206 is projected as projection light 207 on a screen 208 through the projection optical system 203 for color display.

The light separation and combination optical system is not limited to the light separation and combination optical system 231 as that shown in this specific embodiment. Various embodiments are conceivable and are all included in the scopes of this invention. Also in the three-panel color display system 5020 illustrated in FIG. 19, a control unit 201 controls the modulating operations of a variable light source 101 and micromirrors 104 in such a way that the display timings for the R/G/B colors in one frame are matched with each other as closely as possible. A high-performance color display system 5020 is provided without image quality degradation because the problems of color breakup is now resolved.

According to the invention described above, an image display system using an SLM as a micro-mirror device is now able to display an image with a greater number of gray scales. The improved image with higher number of gray scales can be displayed without operating the SLM at an increased oscillating speed or increasing the number of repetitive micromirrors operations of the SLM.

Although the invention has been described above in detail, the invention is not limited to the above embodiments. Various improvements and changes may of course be made to the extent that they do not depart from the spirit of the invention.

What is claimed is:

1. An image display system comprising:
   a light source for projecting a light;
   a light source control unit for controlling an illumination intensity and/or light emission time of the light projected from said light source; and an SLM (Spatial Light Modulator) having a plurality of pixel elements, wherein each of said pixel elements of the SLM further including a micromirror supported on an elastic hinge for flexibly tilting to different deflection angles for modulating the light projected from the light source for controlling an amount of light reflected from said SLM, wherein the light source control unit controls the light source during at least one time slice in one frame period, and each of said pixel elements of the SLM further comprising an ON electrode and an OFF electrode for controlling said micromirror to operate in an intermediate state between an ON state and an OFF state for modulating the the light projected from the light source in the time slice for reducing a controllable minimum increment amount of light reflected from said SLM wherein said controllable minimum increment amount of light reflected form each of said micromirror is smaller than an amount of light reflected from said micromirror controllable by applying a least significant bit (LSB) of an image control word for increasing a number of controlling gray scales of a display image of said image display system.

2. The image display system according to claim 1, wherein the time slice is a minimum time duration wherein all of the pixel elements in the SLM are operational to control said gray scales of said display image of said image display system.

3. The image display system according to claim 1, further comprising:

a controller for applying a zero voltage to the ON electrode and OFF electrode of said pixel element for controlling said micromirror to oscillate between an ON position and an OFF position for reflecting an intermediate amount of light toward an image projection direction wherein said intermediate amount of light is smaller than an ON amount of light reflected from said micromirror when said micromirror is controlled to deflect in said ON position.

4. The image display system according to claim 1, further comprising:

a controller for applying a voltage to the ON electrode of said pixel element for controlling said micromirror to deflect to an intermediate position between an ON position and an OFF position for reflecting an intermediate amount of light toward an image projection direction wherein said intermediate amount of light is smaller than an ON amount of light reflected from said micromirror when said micromirror is controlled to deflect in said ON position.

5. The image display system according to claim 1, further comprising:

a controller for applying a voltage to the OFF electrode of said pixel element for controlling said micromirror to deflect to an intermediate position between an ON position and an OFF position for reflecting an intermediate amount of light toward an image projection direction wherein said intermediate amount of light is smaller than an ON amount of light reflected from said micromirror when said micromirror is controlled to deflect in said ON position.

6. The image display system according to claim 1, wherein:

the light source control unit controlling the light source by a DC-driven signal and an AC-driven signal in said one frame period, and a timing control unit controlling the light source control unit and the micro-mirror device for synchronizing a pulse-width modulation of the micro-mirror device with a period when the light source is controlled by a DC-driven signal and synchronizing a period when the micro-mirror device oscillating said micromirrors with a period when the light source is controlled by an AC-driven signal.

7. The image display system according to claim 1, wherein:

the light source further comprises a laser light source, an LED light source, or a combination of a laser light source and an LED light source.

8. The image display system comprising:

a light source for projecting a light;

a light source controller for controlling the light projected from said light source;

and a mirror device having a plurality of mirror elements;

the mirror device modulating the light projected from the light source for controlling an amount of light reflected from the mirror device, wherein the light source control unit controls the light source by a AC-driven signal during at least one time slice in one frame period and the mirror device further modulating the light projected from the light source by an intermediate state in the time slice for reducing a controllable minimum increment amount of light reflected from said mirror device for controlling gray scales of a display image of said image display system.

* * * * *